Nov. 29, 1966 L. D. COOK 3,288,465
PNEUMATIC CONVEYOR FOR SYNTHETIC PLASTIC WRAPPING SHEETS
Filed Dec. 2, 1964 4 Sheets-Sheet 1

L. D. COOK
INVENTOR.

BY *Ernest G. Peterson*
AGENT

L. D. COOK
INVENTOR.

United States Patent Office 3,288,465
Patented Nov. 29, 1966

3,288,465
PNEUMATIC CONVEYOR FOR SYNTHETIC
PLASTIC WRAPPING SHEETS
Larry D. Cook, Dallas, Tex., assignor to Hercules
Incorporated, a corporation of Delaware
Filed Dec. 2, 1964, Ser. No. 415,347
1 Claim. (Cl. 271—74)

This invention relates to appartus for the feeding of synthetic film to a package wrapping machine. More specifically, it relates to a modification of the film feed system which facilitates the feeding of limp film to the initial wrapping station of a package wrapping machine.

Continuous, automatically operating, synchronized package wrapping machines are known whereby a continuous flow of items to be wrapped is supplied from one source and individual sheets of wrapping material are supplied from another source to a wrapping station where the wrapping material is mechanically folded about the items and sealed. Many such machines are adapted to produce the individual sheets of wrapping material of the required size by severing the same from a supply roll in an operation synchronized with the wrapping process. An example of such a machine is that shown in U.S. Patent 2,853,841 or that shown collectively in U.S. 2,299,984 and U.S. 2,300,569.

The package wrapping machines which are generally available on the market today and which are currently in the widest use are designed to operate with relatively stiff wrapping material. The most common such wrapping materials are regenerated cellulose (cellophane) and paper. When one attempts to operate the known package wrapping machines with a film such as thin gauge, biaxially oriented polypropylene, difficulties in feeding the film are encountered due to its limpness. Specifically, this limpness makes it impossible for the film to be fed properly to the area immediately beyond the cutting knives and above the elevator. Two problems are encountered. For one thing, the limp film is not amenable to pushing from behind through the distance from the feed roll to the far end of the wrapping station without considerable wrinkling and blunching up. For another, the film is not stiff enought to support itself while it is in the initial wrapping station in positon to be contacted from below by the elevator carrying the item to be wrapped. In this area, some support is necessary or the film will sag into the elevator well.

It is the object of this invention to provide apparatus for conveying the film from the cutting knives into position for the initial wrapping steps and for supporting the film in this position to await the commencement of the wrapping.

The invention and the prior art will be explained with reference to the attached drawings in which.

Figure 1:
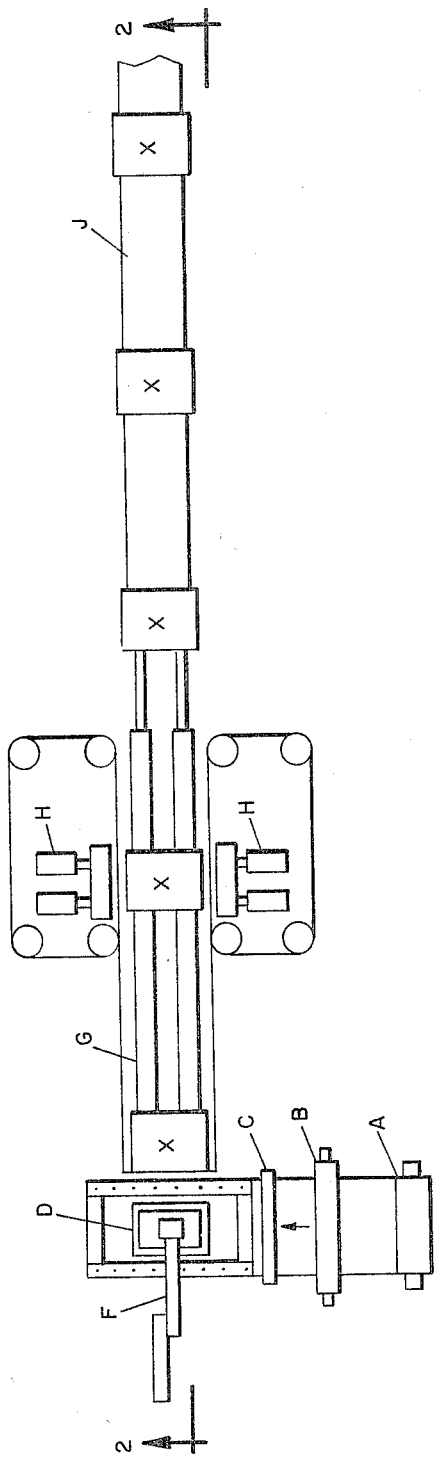
FIGS. 1 and 2 are schematic drawings showing the arrangement of film feeding and wrapping apparatus in a typical wrapping machine.
Figure 2:
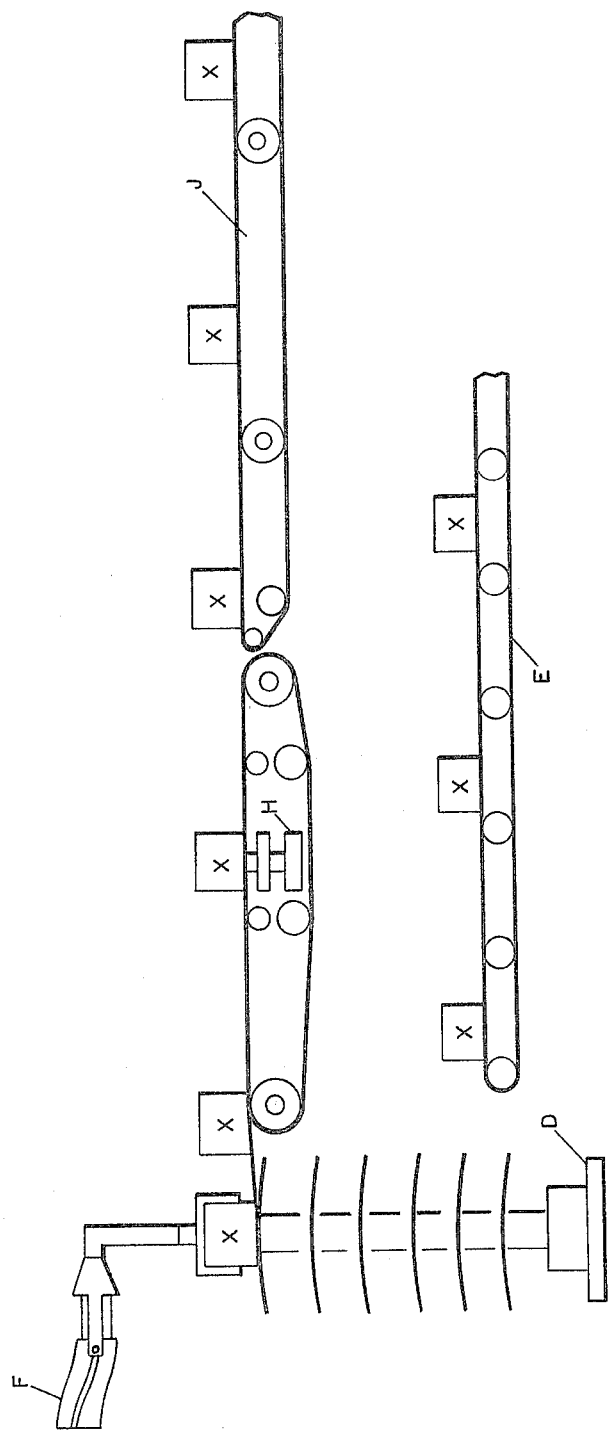

In a typical package wrapping machine as shown in FIGS. 1 and 2, a continuous web of the packaging material is fed from a supply A by means of a pair of feed rolls B to a set of knives C, the feed rolls stop and a sheet of the required size is severed from the web. As the sheet is severed, it is in position directly above an elevator D which periodically receives an item to be wrapped, "X," delivered thereto by a conveyor, E. As the sheet of wrapping material is severed, the elevator with the item resting thereon rises to contact the sheet. By a series of mechanical operations, the wrapping operation is commenced while the item is still resting on the elevator, following which it is puhsed off the elevator by pusher F to another conveyor G which carries it through the remainder of the wrapping operation, then to heat sealing means H and from there take-off conveyor J carries it to further operations such as e.g., crating, shipping, etc. When the wrapped item has been removed from the elevator, the elevator descends once more to receive another item, the feed rolls are activated to deliver another length of the wrapping material and the entire cycle starts again. The operation of the machine, from wripping material feed, to elevator operation, and on through activation of the heat sealing means is synchronized by means of a series of interdependent cams and microswitches.

Figure 3:
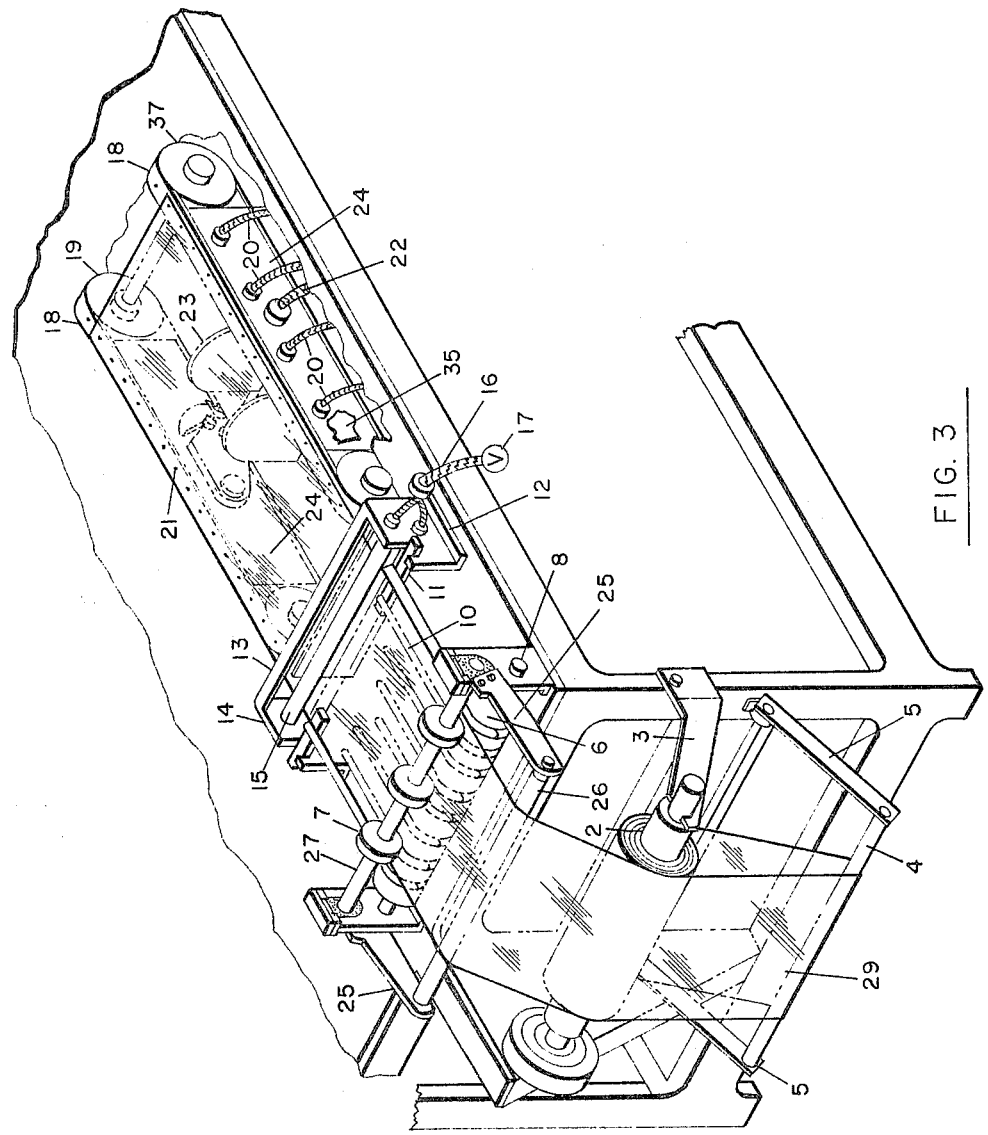
FIG. 3 is a diagrammatic representation in perspective of a film feeding appartus adapted for use with a continuous synchronized package wrapping machine.

The film feeding arrangement shown in FIG. 3 comprises a main supporting frame 1, a film supply roll 2, supported by a bracket 3, a film tensioning idler 4 with mounting arms 5, a film guide idler 26 and stationary mounting arms 25, a film feed roll 6, pressure rolls 7, mounted on shaft 27, feed and pressure roll support member 8, a plurality of film support rods 10, and associated retaining member 11, an upper film cutting blade 13, upper and lower air deflector plates 14 and 28, respectively, upper and lower air supply pipes 15 and 30, respectively, air supply line 16, having a valve 17 therein, and supporting frame 12 for the air tubes and deflector plates. Beyond the cutting blade 13 are found vacuum belts 18, with associated drive pulleys 19, and vacuum chamber 24 with suction lines 20 and pressure line 22. Numeral 23 represents a package delivery elevator.

Figure 4:
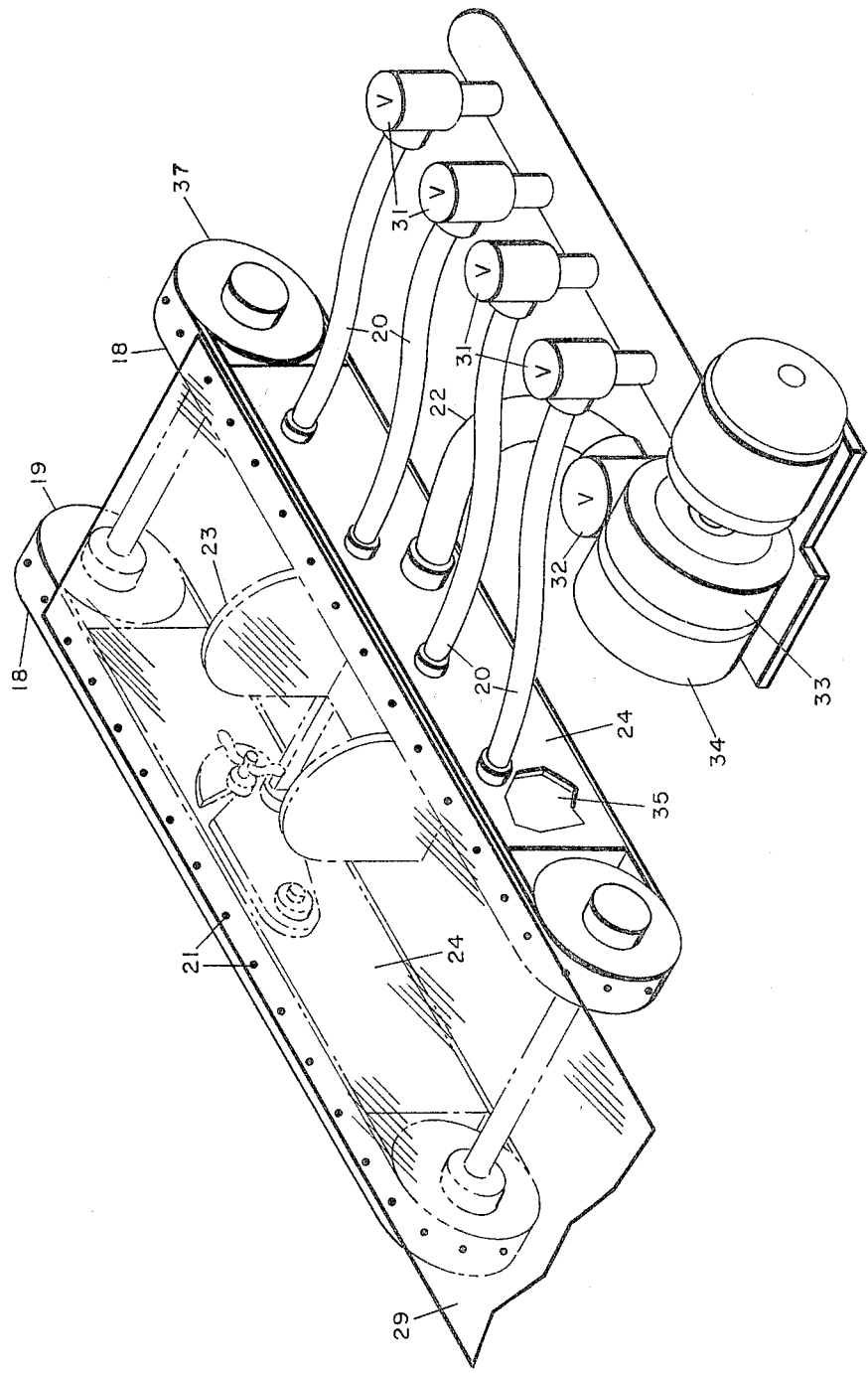
FIG. 4 is a perspective view of the film conveying and supporting apparatus of this invention.

The film conveying aparatus of this invention, shown in detail in FIG. 4, comprises a pair of vacuum chambers 24, each having an endless performated belt 18 associated therewith, two pairs of pulleys 19 and 30, a plurality of vacuum lines 20 with valves 31, an exhaust fan 33 for creating a vacuum within chambers 24, an air supply line 22 with valve 32 and an air supply fan 34.

In operation, film 29 is fed from roll 2, around tensioning idler 4, over guide idler 26 and into the nip between feed roll 6 and pressure roll 7. Driving force for this film feed is supplied by the driven feed roll 6. As film is drawn between feed roll 6 and pressure roll 7, the tensioning idler 4 is raised releasing a brake on roll 2 and permitting the film to be reeled off.

Pressure roll 7 is made of a resilient material such as rubber and is mounted in contact with feed roll 6. As the film enters into the nip between these rolls, it is positively gripped thereby and advanced onto the film support rods 10. The feed roll is driven by an electric motor or other standard drive means (not shown) and its operation is synchronized with that of the remainder of the machine by the main synchronizing cam system. The pressure roll is driven by the rotation of the feed roll.

As the film travels through the nip of the feed and pressure rolls, it comes in contact with the surface of the film support rods 10 and is moved along this surface to a point close to the cutting knives 13.

As the advancing film nears the end of the film support rods 10, it comes under the influence of a venturi effect created by air blowing from air pipes 15 and 30 against deflector plates 14 and 28 and escaping through a relatively narrow opening between the leading edges of plates 14 and 28. The venturi effect of air passing through this narrow opening creates a slight standing wave in the film and supports the film as it passes through this narrow gap, through the knives and beyond into contact with vacuum belts 18.

Vacuum belts 18 are endless perforated belts which revolve in a continuous orbit about vacuum chambers 24, driven by pulleys 19 and 37. The vacuum chambers 24 are substantially completely open on their uppermost surface having merely enough surface to provide a sealing surface for the vacuum belts. The belts ride upon the upper surface of the vacuum chamber 24 with their perforations 21 communicating with the interior 35 of the chamber. The vacuum chamber 24 is evacuated through vacuum lines 20, whereby a suction is created through perforations 21 causing the edges of the film to be securely gripped by the belts as soon as the leading edge passes through the cutting knives. The rate of travel of the vacuum belts is slightly greater than that of the feed roll. The vacuum belts thus not only assist in forwarding and supporting the film, they also assure that there is no slack between the feed roll and the cutting knives and that the film is held taut for cutting.

When the predetermined length of film has been advanced into position beyond the cutting knives, the advancement of the film is automatically stopped by the synchronizing cam system mentioned previously which causes the power to the feed rolls to be shut off. Simultaneously, the air supply to the air pipes 15 and 30 is shut off and the cutting knives are actuated to sever a single sheet of predetermined length from the advancing film. As soon as the cutting operation has been accomplished, air flow to the pipes is resumed in order to support the now unsupported leading edge of the film.

The severed sheet of the film is now positioned directly above the elevator 23 and is supported from sagging by the vacuum being drawn on both edges thereof through vacuum belts 18. The arrival of the severed film is wrapping position actuates elevator 23 to rise with the item to be wrapped and to meet the film. As soon as the rising elevator contacts the film, the vacuum holding the film to the belts is broken by admitting air into the chamber through air line 22 sufficient to create momentarily a positive pressure within the chamber. This positive pressure is not sufficient to blow the film off the belts altogether, but is required in order to assure that it can be lifted off the belts uniformly. The discontinuance of the vacuum and the establishment of positive pressure are accomplished by the automatic actuation of the valves 31 and 32, respectively. This actuation is synchronized by the main synchronizing cam and microswitch system previously referred to.

When the severed sheet of film has been removed from the belts, the feed oil is actuated, suction is resumed on the belts and the entire cycle is repeated.

The perforated belts can be made of any relatively flexible material which is capable of forming a tight seal when in contact with the vacuum chambers. An elastomeric material such as rubber is preferred, though leather or rubber impregnated fabric can also be used.

The peforations in the belts can be varied considerably. Typically, about ⅛-inch holes are used. They are spaced closely enough to assure good contact between the film and the belt, generally about ¼-inch between perforations.

Proper operation of the vacuum belts requires only a relatively small amount of vacuum, on the order of 1 inch of water below atmospheric. The method of creating this vacuum is not critical so long as the method chosen is capable of creating sufficient vaccum. Cheap and efficient means such as an exhaust fan are very effective. Other means, such as steam jets or the like may be used, though these are less attractive economically and more difficult to control.

When the vacuum is released to facilitate removal of the film from the belts, it is only necessary to raise the pressure within the chamber to atmospheric or slightly below. This can be effected in any convenient way, as e.g. by admitting gas from a compressed gas cylinder for a time sufficient to pressurize the chamber or by pressurizing with a supply fan.

What I claim and desire to protect by Letters Patent is:

In a machine for wrapping articles in individual sheets of synthetic plastic film, film feeding means for advancing individual sheets longitudinally to a wrapping position and for holding the same longitudinally and transversely extended in the wrapping position, said film holding means comprising a pair of opposed vacuum chambers disposed in spaced parallel relation and having vacuum chambers disposed in spaced parallel relation and having film supporting surfaces disposed in a common plane and defining spaced parallel tracks in said plane and with a clear space between the same for introducing an article to be wrapped, a continuous belt encircling each of said vacuum chambers and arranged generally in planes normal to said common plane and through said film supporting surfaces with each of said belts having a film feeding run in which said belt moves along the film supporting surface of the respective one of said vacuum chambers, said belts having openings communicating with the interior of said vacuum chambers while said belts are in the film feeding runs whereby the individual sheets are held on the belts by vacuum applied through said openings to the longitudinal edges of the sheets, means for creating a vacuum in said vacuum chambers, and means for selectively discontinuing the vacuum and creating a positive pressure within the vacuum chambers whereby the sheet is released from said belt.

References Cited by the Examiner

UNITED STATES PATENTS

| 3,084,491 | 4/1963 | Solomon | 271—74 X |
| 3,140,030 | 7/1964 | Stewart | 226—95 |
| 3,143,016 | 8/1964 | Obenshain | 226—97 X |
| 3,198,517 | 8/1965 | Martin | 271—74 |

FOREIGN PATENTS

| 888,350 | 1/1962 | Great Britain. |
| 371,945 | 10/1963 | Switzerland. |

M. HENSON WOOD, Jr., *Primary Examiner.*

V. C. WILKS, *Assistant Examiner.*

UNITED STATES PATENT OFFICE
CERTIFICATE OF CORRECTION

Patent No. 3,288,465                                    November 29, 1966

Larry D. Cook

It is hereby certified that error appears in the above numbered patent requiring correction and that the said Letters Patent should read as corrected below.

Column 1, line 42, for "blunching" read -- bunching --; line 59, for "appartus" read -- apparatus --; column 2, line 3, for "puhsed" read -- pushed --; line 13, for "wripping" read -- wrapping --; line 36, for "performated" read -- perforated --; column 4, lines 25 and 26, strike out "vacuum chambers disposed in spaced parallel relation and having".

Signed and sealed this 12th day of September 1967.

(SEAL)
Attest:

ERNEST W. SWIDER                                    EDWARD J. BRENNER
Attesting Officer                                        Commissioner of Patents